United States Patent
Dehni

(10) Patent No.: US 11,932,763 B2
(45) Date of Patent: *Mar. 19, 2024

(54) FLEXIBLE POLYURETHANE AND POLYURETHANE/POLYORGANOSILOXANE FOAM MATERIALS THAT ABSORB IMPACT ENERGY

(71) Applicant: Virfex, LLC, West Wareham, MA (US)

(72) Inventor: Ghassan Dehni, Salt Lake City, UT (US)

(73) Assignee: Virfex, LLC, West Wareham, MA (US)

(*) Notice: Subject to any disclaimer, the term of this patent is extended or adjusted under 35 U.S.C. 154(b) by 833 days.

This patent is subject to a terminal disclaimer.

(21) Appl. No.: 16/189,781

(22) Filed: Nov. 13, 2018

(65) Prior Publication Data

US 2019/0345330 A1 Nov. 14, 2019

Related U.S. Application Data

(63) Continuation of application No. 14/477,521, filed on Sep. 4, 2014, now Pat. No. 10,138,373.

(60) Provisional application No. 61/873,661, filed on Sep. 4, 2013.

(51) Int. Cl.
| | |
|---|---|
| A41D 13/05 | (2006.01) |
| A41D 13/06 | (2006.01) |
| A42B 3/12 | (2006.01) |
| C08G 18/48 | (2006.01) |
| C08G 18/61 | (2006.01) |
| C08G 18/76 | (2006.01) |
| C08J 9/14 | (2006.01) |
| C08L 75/08 | (2006.01) |
| C08L 81/04 | (2006.01) |
| C08L 83/04 | (2006.01) |

(52) U.S. Cl.
CPC .......... *C08L 75/08* (2013.01); *A41D 13/0512* (2013.01); *A41D 13/06* (2013.01); *C08G 18/48* (2013.01); *C08G 18/61* (2013.01); *C08G 18/7664* (2013.01); *C08L 81/04* (2013.01); *C08L 83/04* (2013.01); *A42B 3/125* (2013.01); *C08G 2110/0008* (2021.01); *C08G 2110/0058* (2021.01); *C08G 2110/0066* (2021.01); *C08G 2350/00* (2013.01); *C08G 2410/00* (2013.01); *C08J 9/14* (2013.01)

(58) Field of Classification Search
CPC .... A42B 3/125; A41D 13/0512; A41D 13/06; C08G 18/48; C08G 18/61; C08G 18/7664; C08G 2350/00; C08L 75/08; C08L 81/04; C08L 83/04

See application file for complete search history.

(56) References Cited

U.S. PATENT DOCUMENTS

| | | |
|---|---|---|
| 3,373,122 A | 3/1968 | Porter et al. |
| 3,850,861 A | 11/1974 | Fabris et al. |
| 3,959,191 A | 5/1976 | Kehr et al. |
| 3,978,011 A | 8/1976 | Molbert |
| 4,043,329 A | 8/1977 | DiMatteo |
| 4,058,493 A | 11/1977 | Prokai et al. |
| 4,167,612 A | 9/1979 | Tucker et al. |
| 4,362,510 A | 12/1982 | Brauer et al. |
| 4,758,601 A | 7/1988 | Haas et al. |
| 5,254,597 A | 10/1993 | Horn et al. |
| 5,344,584 A | 9/1994 | Verhelst et al. |
| 5,527,833 A | 6/1996 | Kuczynski et al. |
| 5,688,860 A | 11/1997 | Croft |
| 5,786,402 A | 7/1998 | Bruchmann et al. |
| 5,844,012 A | 12/1998 | Petrella et al. |
| 6,046,247 A | 4/2000 | Glück et al. |
| 6,191,179 B1 | 2/2001 | Scherzer et al. |
| 6,201,035 B1 | 3/2001 | Tuinman et al. |

(Continued)

FOREIGN PATENT DOCUMENTS

| | | |
|---|---|---|
| CN | 101735763 A | 6/2010 |
| CN | 101792152 A | 8/2010 |

(Continued)

OTHER PUBLICATIONS

Borontsova et al.; "New Products Based on the Reaction of Rosin Acids with Isocyanates;" Gidroliz. Lesokhim. Prom.; (1985); pp. 16-17; No. 1.

(Continued)

*Primary Examiner* — Melissa A Rioja

(74) *Attorney, Agent, or Firm* — Thorpe North & Western, LLP.

(57) ABSTRACT

A polyurethane foam, a polyurethane/polyorganosiloxane foam, and a polyurethane foam polyurethane/polyorganosiloxane foam material are disclosed and described herein. The materials are formed in the presence of a polymerization reaction initiator (an isoprenoid compound), and a polymerization reaction accelerator. The polyurethane foam is formed from an isocyanate and a polyol. The polyurethane foam polyurethane/polyorganosiloxane foam material comprises the polyurethane foam which is cross-linked to the polyurethane backbone to a polyurethane/polyorganosiloxane foam. Optional gelling agents, emulsification control agents, reinforcement fillers, cross-linkers, reinforcement polymers, rubber reinforcers, silk proteins, emollients, stabilizers and colorants are also described. The polyurethane and polyurethane-polyorganosiloxane foam materials exhibit a high degree of flexibility, resilience and excellent impact absorption.

21 Claims, 5 Drawing Sheets

(56) References Cited

U.S. PATENT DOCUMENTS

| | | |
|---|---|---|
| 6,232,356 B1 | 5/2001 | Mercando et al. |
| 6,288,133 B1 | 9/2001 | Hagquist |
| 6,326,077 B1 | 12/2001 | Monaci |
| 6,455,605 B1 | 9/2002 | Giorgini et al. |
| 6,509,388 B1 | 1/2003 | Addison |
| 6,831,130 B2 | 12/2004 | Fujita et al. |
| 6,884,507 B2 | 4/2005 | Lin et al. |
| 7,538,154 B2 | 5/2009 | Pohl et al. |
| 8,176,830 B1 | 5/2012 | Tan |
| 2004/0116545 A1 | 6/2004 | Jakobstroer et al. |
| 2004/0153040 A1 | 8/2004 | Martineau et al. |
| 2004/0162385 A1 | 8/2004 | Krebs |
| 2006/0062831 A1 | 3/2006 | Meyer-Ingold et al. |
| 2006/0234899 A1 | 10/2006 | Nekmard et al. |
| 2007/0072951 A1 | 3/2007 | Bender et al. |
| 2007/0128367 A1 | 6/2007 | Tabakovic et al. |
| 2007/0197672 A1 | 8/2007 | Lekovic et al. |
| 2010/0286584 A1 | 11/2010 | Areskoug et al. |
| 2011/0041675 A1 | 2/2011 | Ermalovich |
| 2011/0184080 A1 | 7/2011 | Schönberger et al. |
| 2011/0196329 A1 | 8/2011 | Eckstein et al. |
| 2012/0009414 A1 | 1/2012 | Golini |
| 2012/0031924 A1 | 2/2012 | Schmitt et al. |
| 2013/0174416 A1 | 7/2013 | Esseeghir et al. |
| 2013/0309498 A1 | 11/2013 | Chao et al. |

FOREIGN PATENT DOCUMENTS

| | | |
|---|---|---|
| DE | 2406088 A1 | 8/1975 |
| EP | 0019375 A1 | 11/1980 |
| GB | 1498030 A | 1/1978 |
| JP | S50-87196 A | 7/1975 |
| JP | S5111896 A | 1/1976 |
| JP | H01-123839 A | 5/1989 |
| JP | H05-5247339 A | 9/1993 |
| JP | H08-41157 A | 2/1996 |
| JP | 2001-088158 A | 4/2001 |
| SU | 1752742 A1 | 8/1992 |
| WO | WO 2012/076186 A2 | 6/2012 |
| WO | WO 2013/092564 A1 | 6/2013 |

OTHER PUBLICATIONS

Forrest; "Coatings and Inks for Food Contact Materials;" RAPRA Review Reports; (Nov. 6, 2005); 142 pages; vol. 16, Report 186; <ISSN: 0889-3144>.

Yuan et al.; "Effect of the Addition of Wood Flours on the Properties of Rigid Polyurethane Foam;" Journal of Applied Polymer Science; (2009); pp. 2902-2909; vol. 113; <doi: 10.1002/app.30322>.

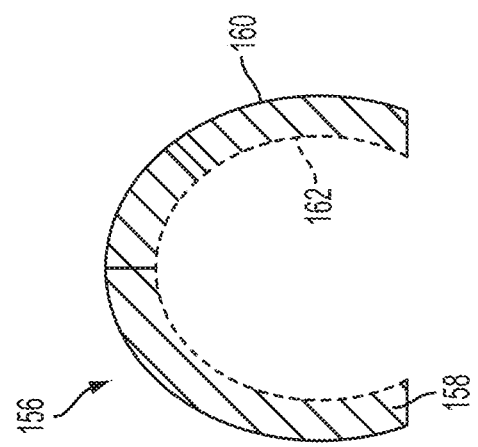
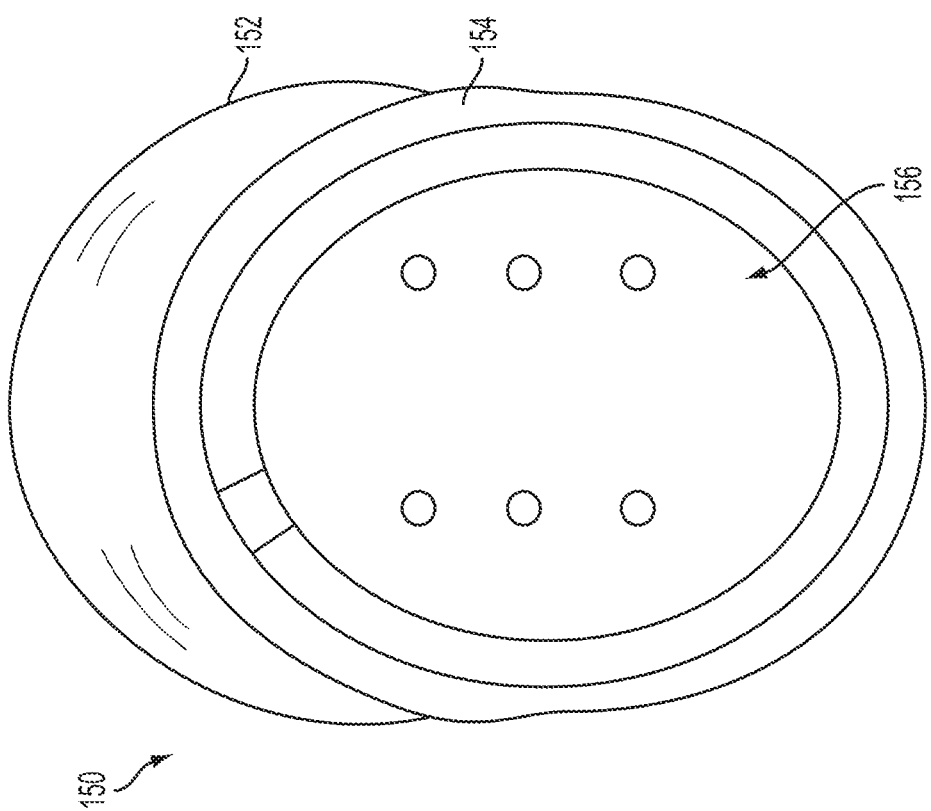

FLEXIBLE POLYURETHANE AND POLYURETHANE/POLYORGANOSILOXANE FOAM MATERIALS THAT ABSORB IMPACT ENERGY

RELATED APPLICATION(S)

This application is a continuation of U.S. Non-Provisional application Ser. No. 14/477,521, filed on Sep. 4, 2014 and now issued as U.S. Pat. No. 10,138,373, which claims priority to U.S. Provisional Application No. 61/873,661, filed on Sep. 4, 2013, both of which are incorporated herein by reference.

FIELD OF THE INVENTION

This invention relates to polyurethane foam and polyorganosiloxane foam materials. The foam materials can be used in impact protective devices within various environments such as, but not limited to include; the bumper of a vehicle, the doors of a vehicle, protective helmets, protective padding, groin cups and shoe soles. Accordingly, the invention relates generally to the fields of polymer chemistry and polyurethane/polyorganosiloxane rubber foams.

BACKGROUND

It is well documented that flexible polyurethane foam is produced from: a polyol, an isocyanate, water, a catalyst, and a surfactant. Polyol and isocyanate are mixed to form a polyurethane linkage. Water is present as a blowing agent and an aqueous medium. Additives, catalyst and surfactant serve to promote nucleation, stabilization of the foam formation during the development stage, and improve foam properties for commercial application.

Polyurethane properties in flexible foam are influenced by the types of isocyanate and polyols used. The most commonly used isocyanates are aromatic diisocyanate or methylene diphenyl diisocyanate (MDI). Polyols can be polyether polyols or polyester polyols. Polyether polyols are made by the reaction of epoxides with an active hydrogen containing starter compounds. Examples of polyether polyols, among others, are: propylene glycol, 1,3-butanediol, 1,4-butanediol, ethylene glycol, neopentyl glycol, 1,6-hexane diol, diethylene glycol, glycerol, diglycerol, pentaerythritol and trimethylol propane and similar low molecular weight polyols. Polyester polyols are formed by polycondensation of multifunctional carboxylic and hydroxyl compounds. In addition to the polyether and polyester polyols, polymer polyols can be used in flexible polyurethane foam to increase foam resistance to deformation. There are two types of polymer polyols: a graft polyol and a polyurea modified polyol. In addition, some polyols that exist commercially are natural oil polyols. These oleochemical polyols have good hydrophobicity and exhibit excellent hydrolysis resistance, chemical resistance and UV resistance. With the presence of a cross-linker, these natural oil-based polyols (i.e. Sovermol® (BASF)) form a polyurethane by linking with an isocyanate. Natural oil polyols are polyfunctional alcohols based on renewable raw materials like castor oil, soybean oil and palm kernel oil, dipropylene glycol or glycerin which are often added as initiators to produce polyols for more flexible applications. Propylene oxide and/or ethylene oxide are then added to the initiators until a desired molecular weight is achieved. The order and amounts of each oxide affect many polyol properties such as water solubility and reactivity.

In general, polyurethane foam is made using organic polyisocyanates such as phenylene diisocyanate, toluene diisocyanate, hexamethylene diisocyanate, or 4,4-diphenylmethane diisocyanate (MDI).

Flexible polyurethane foam is a common material used to protect objects from impact forces such as in athletic activities, automotive applications, and boating applications. Such foams are lightweight and contain small pores that allow foam to deform elastically under impact so that energy is absorbed and dissipated as the material is compressed. However, flexible foams can only be customized to respond to a very specific range of impact energies and hence generally cannot perform well across a wide range of impact types. A foam that is too soft for an impact will compress too quickly and transmit excessive force to an impacted body. Localized compression of a flexible foam decreases the area over which force is transmitted and therefore increasing pressure and damage of the impact. A foam that is too hard for a specific type of impact will not compress sufficiently and will decelerate the impacted body too quickly. This results in excessive resistance in the early phase of impact and will not compress enough to prolong distance or time of impact. Therefore, advances in impact foams continue to be sought that exhibit light weight, resilience, and desirable impact response to a variety of impact types.

Silicone resins are common and used in various applications due to their superior properties in heat and chemical resistance, electrical insulation properties, water repellency and safety to humans.

SUMMARY

A polyurethane foam material comprising a polyurethane, a polymerization reaction initiator, and a polymerization reaction accelerator is provided. The polyurethane is formed from an isocyanate and a polyol. The polymerization reaction initiator is an isoprenoid compound.

The foam material can optionally further include a polyorganosiloxane polymer. The polyorganosiloxane polymer is cross-linked to the polyurethane.

These foams can be layered to create a polyurethane and polyurethane/polyorganosiloxane composite material. The layered composite can include a modified open cell flexible polyurethane foam layer with cross-linked rubber polymers fused with a second hard foam layer consisting of a modified hybrid polyurethane foam/polyorganosiloxane/rubber foam mixture. Additional optional components can be added to further enhance the foam materials and are more fully outlined in the following detailed description.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 1C is a schematic bottom view of a protective helmet that illustrates another configuration having a foam insert in accordance with one aspect.

FIG. 1D is a side cross-sectional view of the insert of FIG. 1C.

Figure 1B:
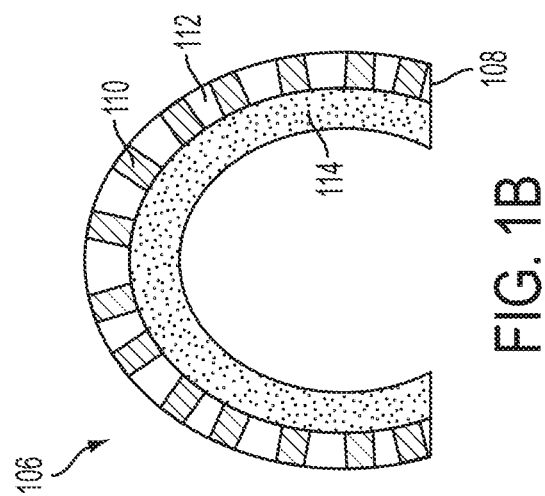
FIG. 1B is a side cross-sectional view of the insert of FIG. 1A.

These drawings are provided to illustrate various aspects of the invention and are not intended to be limiting of the scope in terms of dimensions, materials, configurations, arrangements or proportions unless otherwise limited by the claims. Reference will now be made to the exemplary embodiments illustrated, and specific language will be used herein to describe the same. It will nevertheless be understood that no limitation of the scope of the invention is thereby intended.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "an initiator" includes reference to one or more of such materials and reference to "reacting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, "soft foam" means a foam that is softer than the "hard foam." As used herein, "hard foam" means a foam that is harder than the "soft foam." These expressions should be interpreted flexibly and relative to one another regardless of absolute hardness. The use of soft and hard is not meant to describe the compressive strength of the material, nor the materials ability to resist deformation and should not be interpreted in such a manner. Rather the terms soft and hard are merely included to designate the relationship between the two types of foam presented within the disclosure.

As used herein, "polyurethane" means a polymer composed of a chain of organic units joined by urethane links. Polyurethanes are formed by reacting an isocyanate with a polyol both of which contain an average two or more functional groups per molecule. By reacting two or more isocyanate groups per molecule (R—(N=C=O)$n_2$) with a polyol containing on average two or more hydroxyl groups per molecule (R—(OH)$n_2$) in the presence of a catalyst, a flexible polyurethane foam is produced.

As used herein, "silicone rubber" or "siloxane rubber" is an elastomer composed of silicone polymer containing silicon together with carbon, oxygen and hydrogen. Siloxane rubbers are often one or two parts polymers, are stable, and resistant to extreme temperatures and environments from −55° C. to +300° C. The siloxane rubber is a flexible polymer, and compared to a polyethylene backbone, is much more flexible since the bond length are longer and they can move farther and change conformation easily.

Silicone is an adhesive gel or liquid and must be cured, vulcanized or catalyzed. Silicone rubber can be cured in three ways: a-by a platinum-catalyzed addition cure system, a condensation cure system, and a peroxide cure system or an oxime cure system. In the embodiment of this disclosure, a platinum-catalyzed cure system is used where two separate components must be mixed to catalyze the polymer: one component contains a hydride- and a vinyl-functional siloxane polymer is mixed with a platinum complex creating an ethyl bridge between the two. This platinum based system has a high tear strength and dimensional stability, high resistance to high temperatures, and is safe for the environment, nontoxic and odorless.

In another embodiment of this disclosure, tin-based cure system can be used as a substitute in the presence of an alkoxy cross-linker and silicone polymers. Once the cross-linker is hydrolyzed, it exposes a hydroxyl group at its end which then participates in a condensation reaction with another hydroxyl group attached to the actual polymer. The presence of tin catalyst is not necessary though it does speed up the curing/crosslinking process. Similarly, a peroxide based system can be used. Other polysiloxane rubber polymers such as polydimethylsiloxanes, organofunctional polydimethylsiloxanes or siloxane polyether co-polymers can be used as substitute.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Flexible Polyurethane—Soft Foam

This invention describes a flexible polyurethane foam formed from a unique composition of polyurethane (formed from an isocyanate and a polyol), a polymerization reaction initiator, and a polymerization reaction accelerator. The initiator, and accelerator along with the optional gelling agent, surfactant, and reinforcement filler are added at room temperature as described in the specification.

Flexible polyurethane foam is manufactured as a product of a reaction of two raw materials, a polyol and a diisocyanate. When the raw materials are combined, the reaction forms bubbles and the mixture expands. Although a separate blowing agent can be added the polymerization reaction forms gases which contribute to forming the foamed product. The polyol and the polyfunctional isocyanate react to form polyurethane. The general reaction is shown below.

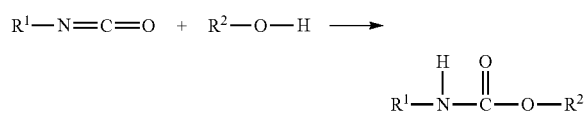

Each $R^1$ group has multiple isocyanate groups; thus, there is a high degree of cross-linking in the polyurethane. Once complete, the raw materials are converted to a usable product.

Water is used as a blowing agent and catalyst in the present invention. However, suitable catalysts that can be used include:

a—Tertiary amines such as N-methylimidazole, N-methylmorpholine, N-ethylmorpholine, triethylenediamine, triethylamine, tributylamine, triethanolamine, pentamethyldiethylenetriamine, pentamethyldipropylenetriaamine, dimethylethanolamine and bisdimethylaminodiethylether b—b—organotins such as water, acetone, pentane, liquid carbon dioxide, HFC, HCF, CFC and methylene chloride.

In one embodiment of the present disclosure, a methylene bisphenyl isocyanate (MDI) solution (commercially available as Polytek®) and a mixture of polyether polyol can be mixed in a volume ratio of 1 to 2, to form polyurethane. Although other proportions can be suitable, this mixture can often comprise about 66% to about 87% by volume of the composition.

In another embodiment of this disclosure, the polyurethane foam is composed of methylene bisphenyl isocyanate, polyether polyol, natural pine rosin, a polymerization reaction accelerator, an alginate-containing hydrogel powder, fumed silica, charcoal or carbon black, natural and synthetic rubber, polysulfide polymer, silk fibroin and hydoxyethyl cellulose.

The polyurethane foam material provides improved impact absorption and resilience while being light weight. This foam can have a shore hardness value from 15 to about 40 A, and most often about 30. Further, this material can be configured for use in a variety of devices. The polyurethane foam is capable of repeatedly absorbing shock without structural damage.

Flexible Polyurethane Foam-Polyorganosiloxane Co-Polymer—Hard Foam

In one embodiment of this disclosure, the polyurethane foam material, described above is combined with an ingredient of a polyorganosiloxane composition. This results in a flexible and tough open cell polyurethane/polyorganosiloxane foam with a shore hardness value of about 85, although about 50 to about 100 can be used. To create the polyorganosiloxane, the polyurethane foam from above, is combined with a polyorganosiloxane, a polymerization catalyst, typically platinum, benzyl alcohol, a polymerization reaction initiator, and a polymerization reaction accelerator. In one embodiment the polyorganosiloxane can be Soma-Foama 15 (Smooth-On Inc) and comprise about 5% by volume. In another embodiment the catalyst can compose about 10% by volume.

The polyorganosiloxane used has two amine or hydroxyl groups attached via a linkage group to one end of the compound. This end group is capable of cross-linking with polyurethane, various other polyols, and cross-linker molecules. The organosiloxane has one or more isocyanate-reactive functional groups. The polyorganosiloxane component has the following formula:

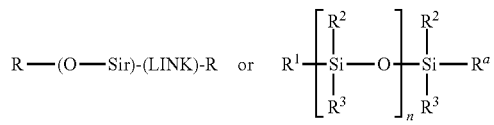

where $R^1$ is a terminal group, $R^2$ and $R^3$ can be organic groups such as methyl, ethyl and phenyl groups, the inorganic silicon-oxygen backbone n is about 1000-5000 repeating units long, LINK is a linking group (shown above as un-bracketed $SiR^2R^3$ group), and $R^a$ is -hydroxyl or amine group. In some cases, the organic side groups ($R^2$ and $R^3$) can be used to link two or more the silicon-oxygen backbones together. One example of a linking group is the alkylene group which may have one or more sulfur atoms, nitrogen or oxygen atoms substituted for a backbone carbon atom. In one embodiment the $R^1$-terminal group may be a trialkylsilyl group ($R_3Si$-groups). In another embodiment the $R^1$ terminal group can be $RR_2Si$-groups. One specific embodiment of the $RR_2Si$-group is a butyldimethylsilyl ($BuMe_2Si$—) group.

The silicone atom will have at least one bond to an organic molecule and this is commonly referred to as siloxane polymer (—R—SiO—). For adhesives, the most common organic group found on the silicon atom is methyl. Other functional groups, such as hydroxyls and amines can be present based on the specific cure chemistry of a formulation. The polymerization catalyst can be platinum, although other catalyst cure system can be used such as a Tin based cure system, a peroxide based cure system or an oxime based cure system. A platinum cure system is used in this disclosure which allows the cure reaction to be accelerated by heat in the presence of only ppm of platinum. Silicone polymers have weak mechanical properties when cross-linked; therefore, in the hard foam, the silicone polymers are reinforced with fillers such as fumed silica and polysulfide polymers.

In the hard foam, the hydrophilic silicone elastomer is cross-linked with another polymeric silicone and with polyurethane polymer. This allows the silicone polymers, Si—H group to react with the free hydroxyl group of a polyurethane polymer and a cross-link Si—O-polyurethane is achieved. In the case of a Si—OH group or Si—$NH_2$ group, reaction with an electrophilic group on a polyurethane compound such as isocyanate, ester group or other electrophilic group will result in a cross-linked elastomer-polyurethane composition.

A silicone elastomer containing at least one functional group (Si—H, Si—OH, $NH_2$, Si—C=C group) is mixed with a polyurethane containing at least one reactive functional group (OH, $NH_2$, methacrylate or olefin vinyl group) to form a cross-linked silicone elastomer/polyurethane polymeric material.

The resultant cross-link structure produced by the chemical interaction of isocyanate group of polyurethane chain and the hydroxyl group of polymethylphenylsiloxane is a hydroxyl functionalized polyorganosiloxane.

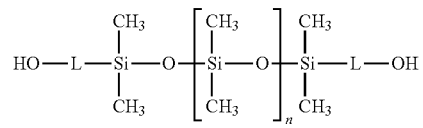

Where L represents either a bond or a linking group selected from divalent hydrocarbons having 1 to 10 carbon atoms. An exemplary embodiment of the hydroxyl functionalized polyorganosiloxane with an exemplary divalent hydrocarbon linking group is shown below.

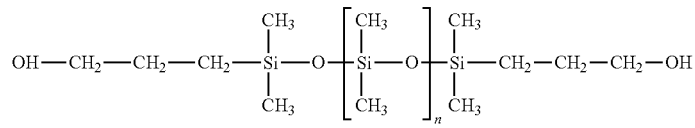

The hydroxyl functionalized polyorganosiloxane is combined with a polyurethane polymer to form a di-functional or multifunctional polyorganosiloxane/diisocyanate cross-linked polymer. The example of the di-functional or multifunctional polyorganosiloxane/diisocyanate cross-linked polymer below does not exemplify the linking group but rather lists the linking group as L.

Polyurethane Polymer

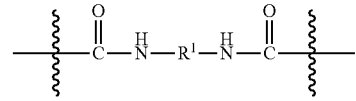

Di-Functional or Multifunctional Polyorganosiloxane/Diisocyanate Crosslinked Polymer

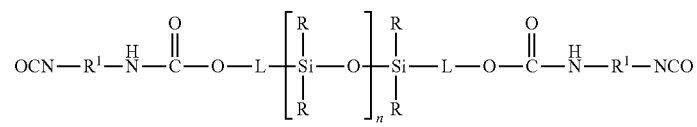

This polymeric material is then cross-linked with a Thiokol polysulfide polymer, cis 1,4 polyisoprene, polybutadiene, polystyrene-block-polybutadiene-block-polystyrene and silk fibroin in the presence of ethylene glycol, abietic acid, diterpenes, N-hydrogel (Polytek), fumed silica (Polytek), carbon black, sulfur, stearic acid and zinc oxide. The entire mixture is mixed vigorously at room temperature inside a chemical hood and poured directly into a mold in the shape of the desired product. The reaction is immediate and violently exothermic with repeated rise and collapse of the foam mixture. The mixture rises two times until the final third rise at which point the exothermic polymerization chain goes to completion. Once this final third rise occurs, polymerization proceeds to completion and the hard open cell polymerized foam takes its final shape and density at room temperature. In one embodiment the polymerization reaction process requires 2-6 hours to cure and where the polyurethane foam is composed of methylene bisphenyl isocyanate, polyether polyol, and isocynate, and combined to the polyorganosiloxane, with a natural pine rosin polymerization reaction initiator, a polymerization catalyst, a polymerization reaction accelerator, and the composition further includes alginate-containing hydrogel powder, fumed silica, carbon black, and hydoxyethyl cellulose. To improve tear strength of the final product, a polysulfide polymer solution containing carbon black, 2-ehylhexyl diphenyl phosphate and polysulfide polymer from Smooth-on Inc is added to the mixture at 8 volume %.

Polyurethane and Polyurethane/Polyorganosiloxane Foam Composite Material

In certain embodiments the polyurethane foam (described above) and the polyurethane/polyorganosiloxane composition (also described above) are cross-linked to one another. In one embodiment the layers may be adjacent to each other. In another embodiment one layer can be fully or partially surrounded by the other layer. In yet another embodiment, the layer can involve a combination of a fully or partially surrounded layer and additional adjacent layers. The actual layering will vary based on the desired product and the shape of the mold.

In order to create the combined layers, one layer is polymerized to completion in a mold, then the other layer is chemically fused to the first layer. The fusion occurs naturally because of polymer cross-linking between the polyurethane foam and the polyurethane/polyorganosiloxane composition. The end product is a one-piece foam composed of a polyurethane portion and a polyurethane/polyorganosiloxane portion. The differing portions can be arranged as adjacent layers and/or as a composite structure having various shapes. If the desired product contains a combination layer, then after the first layer is cured a cutting machine can be used to accurately cut and allow for removal of a portion of the first cured layer. The removed portion can then be filled with the second layer and allowed to cure. In some embodiments a water jet cutting machine can be used to accurately cut and allow for removal of the first layer.

In one embodiment the polyurethane/polyorganosiloxane composition is poured into the mold first and allowed to cure. Then the polyurethane foam is added to the mold and allowed to cure. This creates a polyurethane/polyorganosiloxane outer layer and a polyurethane inner layer. In another embodiment the polyurethane foam is added to the mold first and allowed to cure. Then the polyurethane/polyorganosiloxane composition is poured into the mold and allowed to cure. This creates a polyurethane outer layer and a polyurethane/polyorganosiloxane inner layer.

In one embodiment the polyurethane foam composition comprises from about 70 wt. % to about 85 wt. % of the material and the polyorganosiloxane comprises about 8 wt. % to about 25 wt. % of the material. In another embodiment, the polyurethane foam has a density of about 4 lbs/ft$^3$ and the polyurethane/polyorganosiloxane foam has a density of about 10 lbs/ft$^3$. Although variations can be made, the composite foams can have a hard foam to soft foam hardness ratio from about 1.25 to about 7, in some cases about 2 to about 4, and in one specific aspect about 2.8.

Figure 2:
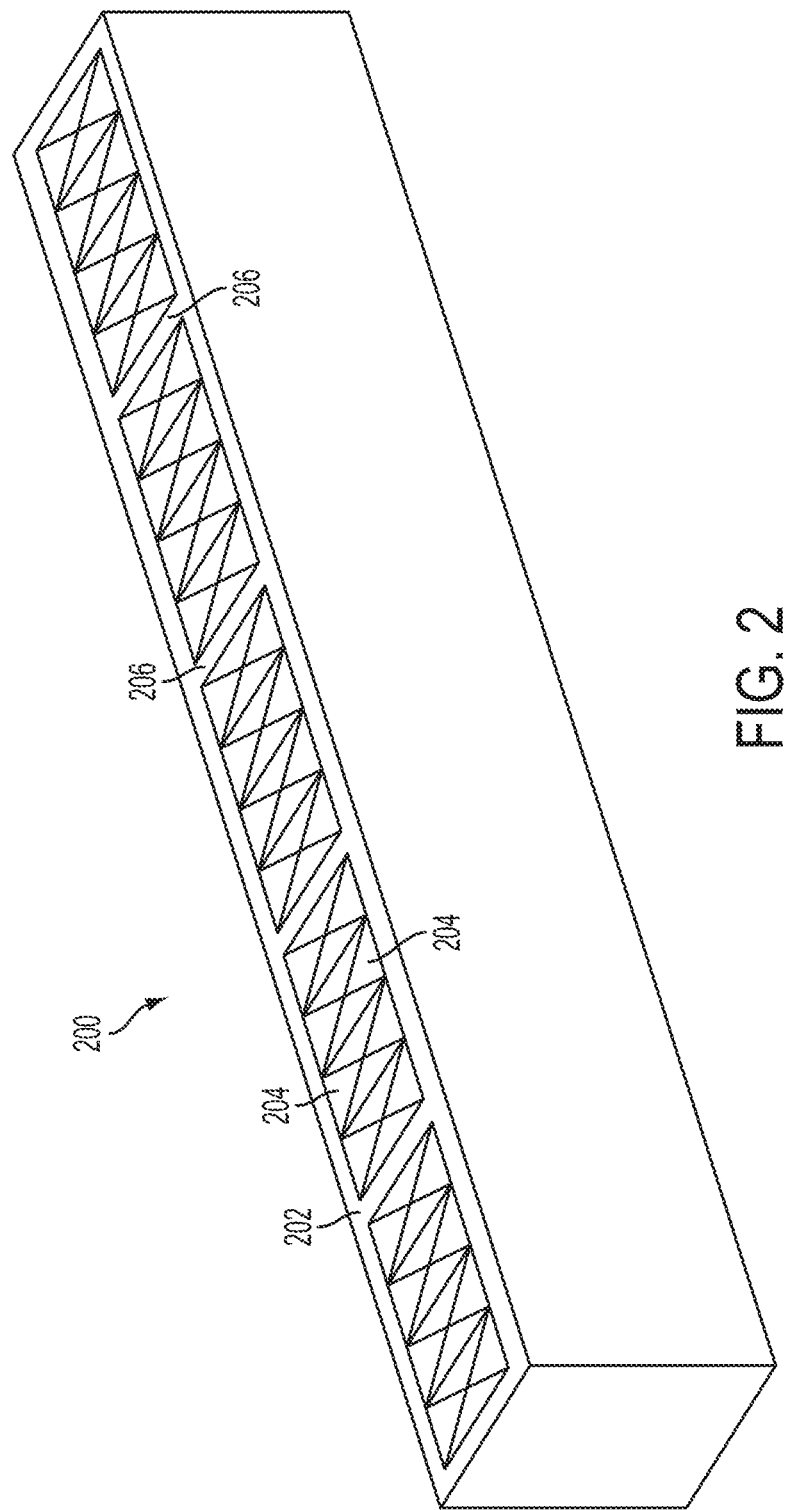
FIG. 2 is a perspective view of a car bumper that illustrates one aspect of the foam material having a composite structure.
Figure 3B:
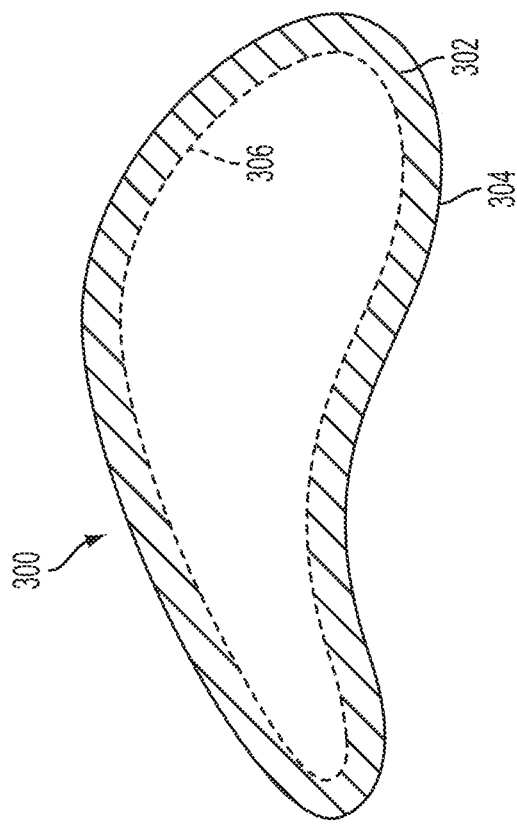
FIG. 3B is a side cross-sectional view of FIG. 3A.
Figure 3A:
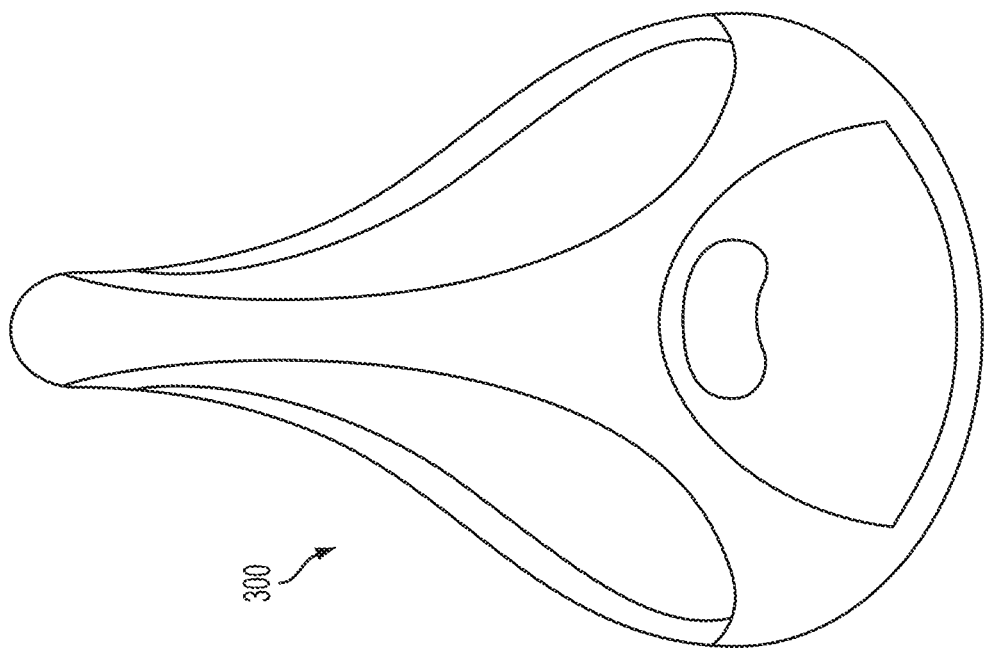
FIG. 3A is a front view of a protective groin cup that illustrates one aspect of use for the polyurethane foam material with the polyurethane/polyorganosiloxane foam.

The two fused layers can be used as an impact protective device. When used in impact protective devises the fused layers help to severely reduce concussion, skull and brain injuries. Exemplary uses are described in detail below. This layered foam combination can be applied to the fabrication of the helmet (FIG. 1A through 1D), car bumper (FIGS. 2A and 2B), and to a groin cup (FIGS. 3A and 3B).

In yet another alternative aspect, the polyurethane foam material can further include as an addition a polysulfide rubber polymer capable of crosslinking. To improve tear strength of the final product, a polysulfide polymer solution containing carbon black, 2-ethylhexyl diphenyl phosphate (a plasticizer) and polysulfide polymer from Smooth-on Inc is added to the polyurethane and to the polyurethane/polyorganosiloxane mixture at 8 volume %. When added, the polysulfide polymer can further crosslink with the polyurethane and polyorganosiloxane to create a polysulfide/polyorganosiloxane/polyurethane foam of high resiliency and tear strength.

Although variations can be made, the polyurethane portion can comprise from about 70 to about 86 vol % of the material. Similarly, the polyorganosiloxane can often comprise from about 5 to about 25 vol % of the material. Further, the polysulfide polymer solution can often comprise about 5 to about 25 vol % of the material. Of particular interest are compositions having from 80 to 86 vol % polyurethane, 7 to 10 vol % polyorganosiloxane, and 7 to 10 vol % polysulfide.

Initiators and Accelerators

During the formation of the polyurethane foam and the polyurethane/polyorganosiloxane foam composition a polymerization reaction initiator and a polymerization reaction accelerator is used. The concentrations of polymerization reaction initiator and polymerization reaction accelerator used in the formulations will vary depending upon the desired use for the foams. The embodiments herein are presented solely as examples and should not be thought of as limiting the disclosure.

Initiators

In this invention, the polymerization reaction initiator is an isoprenoid compound. Non-limiting examples of suitable initiators include abietic acid (a diterpene), camphor (a monoterpene), menthol (a monoterpene), natural liquid tree rubber (a polyisoprene), amyrin (a pentacyclic triterpene), and combinations thereof. Initiators of interest include abietic acid, butadiene, styrene-butadiene-styrene polymer and natural rubber.

Abietic acid (also known as abietinic acid or sylvic acid) is an organic compound that occurs widely in trees and is a primary component of resin acid. Abietic acid belongs to the abietane diterpene group of organic compounds, which are derived from four isoprene units, and have the molecular formula, $C_{20}H_{30}O_2$. Diterpenes form the basis of biologically important compounds such as retinol, retinal, and phytol. These diterpenes are carboxylic acids and initiate polymerization reactions due to active hydroxyl and hydrogen groups. The high polarity of the diterpene, abietic acid also permits compatibility with polyurethane polymers. Due to hydrogen bonding interactions with other polymers in the reaction, diterpene molecules contribute to further reinforcement of the polyurethane chain by supplemental cross-linking and long chain polymer formation. The greater the hydroxyl content in the diterpene compounds, the more hydrogen bonds between the diterpene and the isocyanate group. Hydrogen bonds between a diterpene (abietic acid) and an isocyanate can function as a physical cross-link at room temperature to provide higher shear and cohesive strength and an increase in heat resistance.

Abietic acid can be obtained from *Pinus kesiya royle* (Khasi pine), *Pinus strobus* (Eastern white pine), *Pinus insularis* (Southern pine), *Pinus sylvestris* (Scots pine), *Pinus ponderosa* (Ponderosa pine), *Pinus contorta* (lodge-pole pine), and other sap extracts. Abietic acid can be obtained from pine rosin, also called colophony or Greek pitch, in a solid form of resin obtained from tree pine. Rosin is the nonvolatile portion of the oleoresin of members of the pine family and is the residue left over after the isolation of turpentine. Pine rosin has a primary chemical composition including methyl sandaraco pimaric, methyl isopimaric, methyl palustric, methyl dehydroabietic acid, methyl abietic, methyl neoabietic, and methyl merkusis acids. The highest component in pine rosin is methyldehydroabietic acid (27-28%).

Reactive hot melt of filtered liquid Pine or Lodge Pole rosin containing abietic acid can be added to the composition at about 2% by volume. At room temperature, rosin is soft, sticky and can be brittle but melts when heated at around 85° C. Commercial abietic acid is available and is a glassy partly crystalline yellowish solid that melts at temperatures as low as 85° C. and can be purchased and used as a substitute for pine rosin abietic acid. Suitable ranges for the reaction initiator include from about 2% to about 6% by volume, from about 4% by volume to about 5% by volume or from about 2% to about 10% by volume.

Accelerators

Further, a polymerization reaction accelerator is combined with the mixture described above. Non-limiting examples of suitable accelerators include charcoal, activated carbon, diamonds, fullerenes, graphites, coke, coal, carbon black and combinations of these materials. Accelerators of interest include activated hardwood carbon, charcoal, and carbon black.

The preferred accelerators for the polyurethane foam are activated hardwood carbon and charcoal. Activated carbon is carbon that has been treated with oxygen, and is a highly porous material and extremely high surface area. Activated pure hardwood carbon behaves as accelerator in the polymerization mix by decreasing the time of the cross-linking reaction. It also works as a strong filler-matrix interaction. If charcoal is used as an accelerator, $C_7H_{40}$ can be used. Charcoal is a light black residue consisting of 85.5% to 98% carbon and residual ash. Regardless, specific types of charcoal can vary and suitable variations can include, but are not limited to, lump charcoal, pillow shaped briquettes, hexagonal Sawdust Briquette charcoal, extruded charcoal, Japanese charcoal and combinations of these materials. Each charcoal type contains varying amounts of hydrogen and oxygen.

In one example, the accelerator for the polyurethane/polyorganosiloxane composition is carbon black. Carbon black is a para-crystalline carbon. In addition to being used as an accelerator, carbon black can be used as a filler.

When added to the composition, the polymerization reaction accelerator can comprise from about 2% to about 3% by volume, and in some cases from about 1% to about 7% by volume.

Optional Additives

The polyurethane foam and the polyurethane/polyorganosiloxane foam can optionally be prepared with a gelling agent, emulsification control agent, a reinforcement filler, rheology modifiers, slip agents, emollients, humectants, or any combination of these additives. The concentrations of optional gelling agent, emulsification control agent, reinforcement fillers, cross-linkers and reinforcement polymers used will vary depending upon the desired use for the foam. The embodiments herein are presented solely as examples and should not be thought of as limiting the disclosure.

Gelling Agent

Gelling agents are thickeners that form a gel, dissolving in the liquid phase as a colloid mixture and forming a weakly cohesive internal structure. There are many suitable gelling agents. Non-limiting examples of suitable gelling agents include: alginate containing hydrogel powder, acacia, alginic acid, bentonite, Carbopols® (now known as carbomers), carboxymethyl cellulose. ethylcellulose, gelatin, hydroxyethylcellulose, hydroxypropyl cellulose, magnesium aluminum silicate (Veegum®), methylcellulose, poloxamers (Pluronics®), polyvinyl alcohol, sodium alginate, tragacanth, hyaluronan, polyethylene, carrageenans, polypropylene glycol, agar and polyvinylpyrrolidone, polyacrylic acid, hydrocolloid polyesters, chitosen, collagen, xanthan gum, and combinations thereof.

Though each gelling agent has unique properties, some gelling agents are more soluble in cold water than in hot water; others require a "neutralizer" or a pH-adjusting chemical to create the gel after the gelling agent has been wetted in the dispersing medium; most require 24-48 hours to completely hydrate and reach maximum viscosity and clarity. Gelling agents can typically be used in concentrations from about 0.5% to about 10% by volume and from about 4% by volume to about 6% by volume depending on the agent.

One preferred gelling agent is alginic acid containing hydrogel powder. For example, Hydrogel-N powder (commercially available as Polytek®), contains a mixture of magnesium carbonate, alginic acid, sodium pyrophosphate, and calcium sulfate, and can be added to the polyurethane mixture at room temperature at a volume ratio of about 4% to about 6% by volume, and in some cases about 2% to about 10% by volume at room temperature. Once the gelling agent is added to the mixture, polar hydrophilic groups are hydrated upon contact with water. The network then swells and exposes the hydrophobic groups, making the hydrophobic groups capable of interacting with water. This swelling process by interacting with the water molecules is then opposed by covalent or physical cross-links during gelation.

Hydrogel polymers can serve as chain extenders with the help of ethylene glycol and cations such as $Mg^{2+}$ and $Ca^{2+}$. Urea linkages are formed by the reactions between —NCO groups of the MDI bisphenyl isocyanate and water or —COO group of the alginic acid present in the hydrogel mixture. This chemical bonding further contributes to cross-linking and chain extension in the polymerization reaction.

Surfactants-Emulsifying Control Agents

Surfactants can be added to polyurethane and to polyurethane/polyorganosiloxane to emulsify the liquid components, regulate foam cell size, stabilize cell structure to prevent collapse during polymerization, and to fill subsurface voids. Various emulsification control agents can exhibit advantages such as use in recycling, cost reduction, mechanical properties and acoustic capability enhancement. Non-limiting examples of emulsification control agents can include fumed silica, silicone oil, nonylphenol ethoxylates, polydimethylsiloxane-polyoxyalkylene, polyethylene terephthalate, carbon nanotube, calcite, dolomite, calcium carbonate, and any combination thereof. One preferred emulsification control agent is fumed silica (commercially available as Polytek®), a synthetic amorphous silicon dioxide. Emulsification control agents can be added to the polyurethane mixture at about 4% to about 6% by volume, from about 4% to about 8% by volume, and in some cases about 2% to about 10% by volume at room temperature.

Reinforcement Fillers

Reinforcement filler can be added to the polyurethane foam and/or the polyurethane/polyorganosiloxane foam to enhance creep resistance and foam elastic modulus of the foams. Reinforcement fillers are capable of cross-linking and contribute to the increased resilience, toughness, and comprehensive strength of the material. Examples of such fillers include hydroxyethyl cellulose polymer, hydroxypropyl methyl cellulose, cellulose acetate, cellulose nitrate, hydroxyethyl methyl cellulose, ethyl cellulose, methylcellulose, natural tree rubber latex, synthetic rubber (i.e. polybutadiene), and hot-melt branched Polystyrene-block-polybutadiene, 30% styrene, 80% diblock, polysulfide polymers and combinations thereof.

A cellulose fiber is composed of micro-fibrils where the cellulose chains are stabilized laterally by inter and intramolecular hydrogen bonding as well as hydrogen bonding to the isocyanate group and other newly formed polymers. Such hydrogen bonding serves as further reinforcement fillers in polyurethanes. In one embodiment hydroxyethyl cellulose polymer is used as the reinforcement polymer. The hydroxyethyl cellulose polymer is a modified, water-soluble polymer made by reacting ethylene oxide with alkali-cellulose. Hydroxyethyl cellulose can be added from about 0.5% to 2% by volume. Natural tree rubber latex can be used at about 1% by volume as a substitute or in conjunction with cellulose. In another embodiment the reinforcement filler can comprise about 0.2 wt. % about 4 wt. % of the material. As a general guideline, reinforcement fillers can comprise about 0.2% to 10% by volume of the polyurethane foam material. In some embodiments the reinforcement filler can gave rise to novel and functional polymers and co-polymers.

Cross-Linker

If desired, the polyurethane foam and/or the polyurethane/polyorganosiloxane polymer hybrid foam composition can be formed in the presence of a cross-linker. Non-limiting examples of suitable cross-linkers include ethylene glycol, zinc oxide, sulfur, 1,4-butanediol, 1,6-hexanediol, cyclohexanedimethanol, hydroquinone bis(2-hydroxyethyl)ether (HQEE), diethanolamine, diisopropanolamine, triethanolamine and tripropanolamine and combinations thereof. When the previously described polymerization mixture is mixed in the presence of ethylene glycol, unique and novel polymer polyols can be produced, which then serve as chain-extenders and cross linkers to the isocyanate chain. Such a composition can have a density of about five pounds per cubic foot, although other densities can be achieved based on variations of foaming agents and other factors.

It is notable that toluene diisocyanate, primarily used generally as a chemical intermediate in the production of polyurethane products, hexamethylene diisocyanate (HDI) and isophorone diisocyante (IPDI) are excluded from the composition in this invention even though they can be used as a substitute for 4,4' Methylene bis(phenylisocyanate) to produce polyurethane. In this invention, 4,4' Methylene bis(phenylisocyanate), MDI, is used.

Reinforcement Polymers

A reinforcement polymer can optionally be used to cross-link the polyurethane backbone to the polyurethane/polyorganosiloxane co-polymer, other polyols and to each other. The reinforcement polymer can be chosen from: polysulfide polymer rubber, natural rubber, synthetic rubbers such as polybutadiene and polystyrene-block-polybutadiene-block polystyrene, pure silk fibroin and combinations thereof. Where latex allergies are a concern, natural rubber can be omitted from the formulations.

Rubber Reinforcers

Further reinforcement can be achieved by further cross-linking the polyurethane foam composition and/or the polyurethane/polyorganosiloxane composition with a combination of liquid polysulfide polymer rubber, hot melt natural latex rubber (melted at 350° F.), liquid polybutadiene rubber and hot melt styrene-butadiene-polystyrene rubber (melted at 375° F.). The art of using a combination of natural and synthetic rubber contributes directly to the toughness and resilience of the polymerized end product and dramatically increases the load absorbing capacity generated by an impact force.

It is well known that the physical properties of elastomeric polymeric composition are improved by cross-linking or vulcanization as is the case of cross-linking natural rubber with sulfur. Available commercial elastomeric compositions such as polybutadiene, acrylonitrile-butadiene copolymer and styrene-butadiene copolymer have been modified to contain carboxyl groups distributed randomly along the length of the polymer chain. Cross-linking of these elastomers in polyurethane foam composition and/or the polyurethane/polyorganosiloxane composition occur by exposing the carboxyl group to zinc oxide and stearic acid in the mixture. Cross-linking of these molecules to the polyurethane/polyorganosiloxane co-polymers and to each other gives rise to novel large and long chain polymers that contribute to the high strength, resilience and impact energy absorption of the foam described in this invention.

Polysulfide Rubber

Polysulfides are a class of chemical compounds containing chains of sulfur atoms and can also be used in connection with the compositions herein. The polysulfide can be included as a mixture with the polyurethane, or as a separate adjacent layer. Two main classes exist: anions and organic polysulfides. Anions have the general formula $S_n^2$ and are the conjugate bases of hydrogen polysulfides $H_2S_n$. Organic polysulfides have the formula $RS_nR$ where R is an alkyl or aryl (i.e. phenyl group). Polysulfide polymers can be synthesized by condensation polymerization reactions between dihalides and alkali metal salts of polysulfide anions.

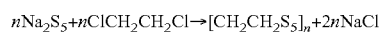

$$nNa_2S_5 + nClCH_2CH_2Cl \rightarrow [CH_2CH_2S_5]_n + 2nNaCl$$

Polysulfide polymers are also prepared by the addition of polysulfanes to alkenes,

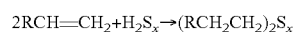

$$2RCH=CH_2 + H_2S_x \rightarrow (RCH_2CH_2)_2S_x$$

Sodium polysulfide, in which n has a value of around 4 has been used in the preparation of rubbery synthetic organic molecules called Thiokols. These molecules are formed by ring-opening polymerization reactions and possess long chains in which polysulfide groups alternate with small organic groups capable of forming two covalent bonds. These Thiokol molecules can be converted by heating with Zinc oxide into tough resilient materials used to make lining of storage tanks and hoses and in other applications requiring resistance to chemical and physical attack. Thiokols have also been used as solid fuels for rockets. In aqueous solution, these molecules have been used as protective coating for wood, metal and concrete surfaces.

A typical Thiokol method of polysulfide synthesis is shown below:

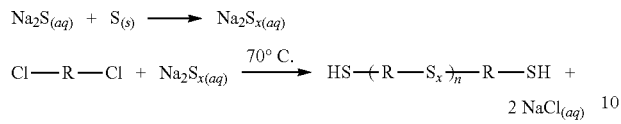

and the average structure of the liquid polysulfide polymer produced by such a reaction is as follows:

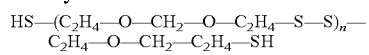

This polymer has terminal mercaptan (or thiol) groups and also has disulphide linkages within the backbone as used in this embodiment. These terminal mercaptan groups of liquid polymers are easily cross-linked by means of epoxide resins, inorganic or organic oxidizing agents and in this invention, it is crosslinked to the isocyanates. The result may be expressed as follows:

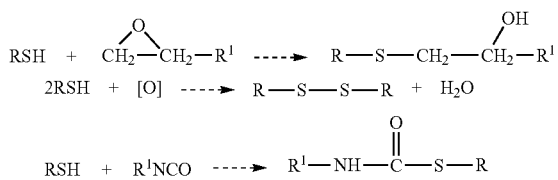

Furthermore, reacting a thiokol polysulfide polymer (Smooth-on polysulfide polymer 68611-50-7) which has 3 to 5 sulfur atom per molecule with an isocyanate like MDI and with various polymers described herein including but not limited to polyoligosiloxane, natural and synthetic rubber in the presence of a cross-linker leads to the formation of novel polymers within the polyurethane foam that contribute to a higher tear strength as observed in this embodiment.

Natural Rubber

Pure Natural rubber elastomers from the tree, *Hevea brasiliensis*, consists of polymers of the organic compound isoprene (cis-1,4 polyisoprene). This rubber can be melted at 350° F. in a melting furnace in a chemical hood and reactive hot melt is added at 2% by volume to the polyurethane foam composition and/or the polyurethane/polyorganosiloxane composition before the addition of MDI. In polyurethane/polyorganosiloxane composition, zinc oxide, stearic acid and sulfur are added to the mixture at 0.2% by volume before the addition of polyorganosiloxane and MDI. The Cis-1,4 polyisoprene is capable of cross-linking to other polyols, to the polyurethane/polyorganosiloxane co-polymer and to each other via sulfur cross-linking at temperature close to 150° C. during the polymerization reaction. This reaction contributes to the increased elasticity and rigidity to the final hard and soft product.

Cis-1,4 Polyisoprene (Polymers in Pure Natural Rubber)

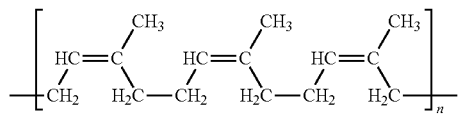

Vulcanized Rubber Chemical Structure

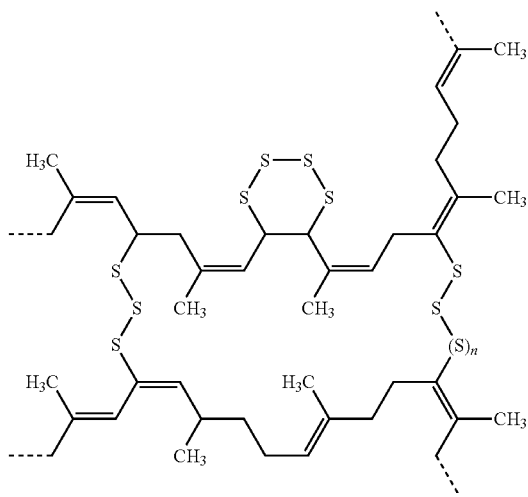

Above is vulcanized rubber with the addition of sulfur at 150° C. during the polymerization reaction of mixture. In applications where there exist latex allergy concerns, natural rubber may be omitted from the composition and only synthetic rubber can be used.

Synthetic Rubber

Synthetic rubber polymer, is any type of artificial elastomer synthesized from petroleum byproducts (monomers). Styrene-butadiene rubbers are derived from the copolymerization of 1,3 butadiene and styrene as used in this disclosure. These can be substituted with synthetic rubber prepared from isoprene (2-methyl-,3-butadiene), chloroprene (2-chloro-1,3-butadiene and isobutylene (2-methylpropene) cross-linked with a small quantity of isoprene. These products can then be mixed in various proportions to create products with a wide range of mechanical, physical and chemical properties which could be used as substitutes or additions to the synthetic rubber/s used in this disclosure.

In one embodiment of this invention, a platinum silicone rubber is used that has been modified with a reactive hydroxyl group capable of cross-linking with the polyol/polyurethane and rubber polymers. In another embodiment, a synthetic rubber polystyrene-block-polybutadiene-block-polystyrene (styrene 30 wt. %)—sigma Aldrich is heated at 375° F. in a melting furnace and the hot melt is added at a 2 volume % to the polyurethane and/or polyurethane/polyorganosiloxane foam before the addition of polyoligosiloxane and MDI. This synthetic rubber is capable of cross-linking to the polyurethane backbone, polyurethane/polyorganosiloxane co-polymers, to other polyols, and other synthetic and natural rubber present in solution. By doing so, it adds rigidity and resilience and increases dramatically the compressive strength of the hard and soft foam.

Polystyrene-Block-Polybutadiene-Block-Polystyrene

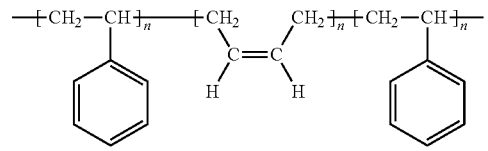

Figure 4A:
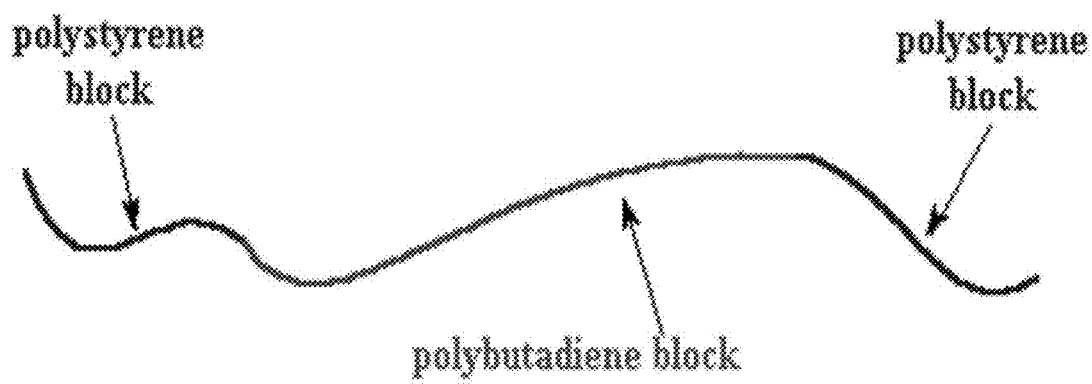
FIG. 4A is a schematic illustration of a polystyrene-polybutadiene-polystyrene block copolymer in one example.

FIG. 4A also shows a schematic illustration of a polystyrene-polybutadiene-polystyrene block copolymer.

Figure 4B:
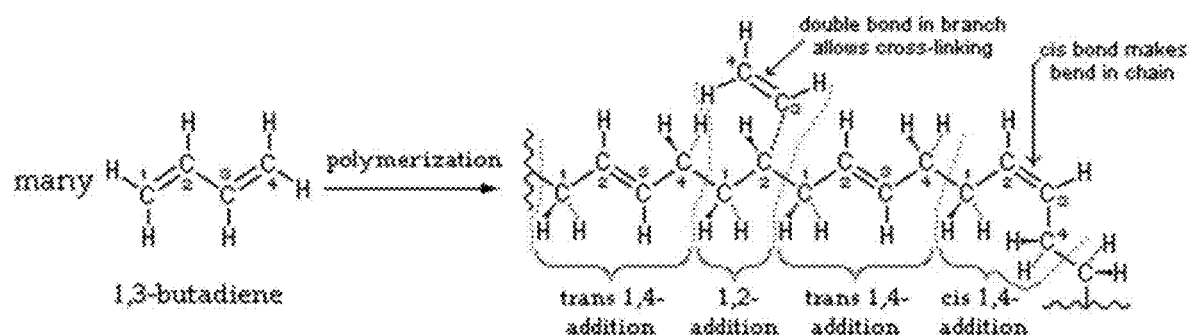
FIG. 4B is a schematic of a polymerization reaction for formation of a polybutadiene polymer in one example.

In addition, a second synthetic rubber is used. Liquid and water soluble hydroxyl terminated polybutadiene (Sigma—MW 3000)) capable of cross-linking is added to mixture 1 and 2 at a concentration of 4 volume %. The liquid polybutadiene is composed of: 72% cis-1,4; 27% trans-1,4; and 1% vinyl as generally illustrated in FIG. 4B. The liquid polybutadiene is capable of cross-linking the polyurethane backbone, to the polyurethane/polyorganosiloxane co-polymer, to other polyols, and to rubber polymers present in solution. The addition of polybutadiene directly contributes to rigidity, compressive strength, resilience of the final hard and soft product.

Silk Protein

Silk consists of two main proteins, sericin and fibroin. Fibroin is an insoluble protein made by spiders, the larvae of *Bombyx mori* silkworm, other moths, and insects. In one embodiment of this disclosure, fibroin derived from the cocoon of the *Bombyx mori* silkworm is used. Silk fibers have exceptional strength. The strength occurs because of the layers of anti-parallel beta sheets. The primary structure of the silk fibron is a recurring sequence of poly(Gly-Ser-Gly-Ala-Gly-Ala).

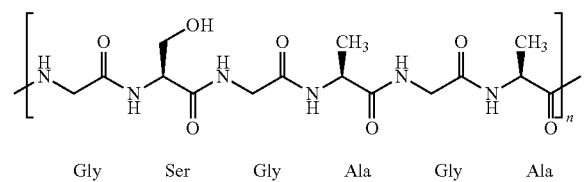

Gly    Ser    Gly    Ala    Gly    Ala

The high glycine and alanine content of each beta sheet allows for several beta sheets to be tightly packed with one another. The beta sheets are arranged so that the crystals alternate in alignment from sheet to sheet. The beta sheets are held together by hydrogen bonds that form between the individual sheets. Hydrogen bonds are weak bonds and not well known for their strength. It is the gradual failure of the hydrogen bonds in a slow and uneven manner that gives silk its considerable elasticity; this allows silk to bend and stretch before it breaks.

Purified silk fibroin in a liquid solution from different insect species has different amino acid arrangements; however most insect silks contain a common primary structural pattern. Therefore, while differences in arrangement may vary the location of the hydrogen bonds and the specific properties of the silk, any insect silk can be used as a substitute for *Bombyx mori* fibroin in this invention.

In one embodiment of this disclosure, the fibroin silk protein can be cross-linked to the polyurethane backbone, the polyurethane/polyorganosiloxane backbone, other polyols and/or to natural and synthetic rubber polymers and co-polymers. When fibroin is cross-linked to the structure of the polyurethane foam or the polyurethane/polyorganosiloxane foam the foam materials exhibit an increase in resilience and strength.

In another embodiment of the disclosure liquid fibroin is used to further increase the tensile strength and rigidity of the polyurethane or the polyurethane/polyorganosiloxane material. Specifically, liquid silk fibroin (which can be acquired from Silktap Inc.) is dissolved in solution at 3% by volume and added to the polyurethane foam. Liquid silk fibroin can also be dissolved in a solution at about 1% to about 2% by volume and be added to the polyurethane/polyorganosiloxane material.

As used, in this disclosure the liquid silk fibroin was stored at 4° C. and used within two weeks. Using liquid silk fibroin quickly is important because the degree of breakage of the peptide chain is positively correlated with the storage time.

If the fibroin is added to either the polyurethane or the polyurethane/polyorganosiloxane composition along with MDI, urethane linkages are formed between the fibroin and the polyurethane pre-polymer. These urethane linkages further increase the mechanical strength and thermal stability of the composition. In this disclosure, the polyurethane linked fibroin polymers improve the mechanical properties and provide higher thermal stability to the modified polymers of the polyurethane.

Emollient/Humectants

In one embodiment, the polyurethane foam and/or the polyurethane/polyorganosiloxane foam can include an emollient or humectant. Example emollients or humectants, include, but are not limited to include: hyaluronic acid, glycerin, glyceryl triacetate, sugar polyols, urea, and the like. In one embodiment of the disclosure, hyaluronic acid may be used to improve the tactile response and feel on surfaces of a final product. As a general guideline humectants can comprise from about 0.05% to about 4% by volume of the polyurethane or polyurethane/polyorganosiloxane foam compositions.

Stabilizers

In certain embodiments, it may be desirable to use a stabilizer when creating the foam compositions. Non-limiting examples of suitable stabilizers can include xanthum gum. Such stabilizers can comprise about 0.5% to about 5% by volume of the polyurethane and/or polyurethane/polyorganosiloxane foam compositions.

Colorants

As yet another option, colorants can be added to the polyurethane foam and/or the polyurethane/polyorganosiloxane foam compositions. Such colorants can include pigments, dyes, or other colored materials. For example, polycolor dyes (e.g. Polytek®) can be added to the mixture during the polymerization reaction to create a colored foam, exemplary but not limiting foam colors include; blue, red or yellow. As a general guideline, colorants can comprise from about 0.01% to about 5% by volume of the composition. The exact amount will vary, depending on desired color intensity.

Novel Polymer Polyols

In one embodiment the disclosure, the polyurethane foam material is comprised of: about 3 volume % pine rosin; about 2.7 volume % activated hardwood carbon or charcoal $C_7H_{40}$; 5.5 volume % Hydrogel-N (Polytek®); about 6-8 volume % fumed Silica (Polytek®); about 0.5-1 volume % hydroxyethyl cellulose; 4 volume % of liquid butadiene (Sigma); 2 volume % of styrene-butadiene-styrene hot melt (375° F.); 2 volume % of natural latex rubber hot met (350° F.); 8 volume % of polysulfide Thiokol polymer; and 0.2-0.5 volume % of natural pure silk fibroin (5% weight/volume solution from Silktap Inc, Cambridge MA).

In another embodiment the disclosure, the polyurethane/polyorganosiloxane foam material is comprised of: about 3 volume % pine rosin; about 2.7 volume % carbon black; 5.5 volume % Hydrogel-N (Polytek®); about 6-8 volume % fumed Silica (Polytek®); about 0.5-1 volume % hydroxyethyl cellulose; 4 volume % of liquid butadiene (Sigma); 2 volume % of styrene-butadiene-styrene hot melt (375° F.); 2 volume % of natural latex rubber hot met (350° F.); 8 volume % of polysulfide polymer; and 0.2-0.5 volume % of natural pure silk fibroin (5% weight/volume solution from Silktap Inc, Cambridge MA).

The above formulations when mixed at room temperature give rise to novel polymer polyols. These novel polymer polyols quickly bind to the isocyanate backbone of the polyurethane foam, to the isocyanate/polyoligosiloxane backbone of the polyurethane/polyorganosiloxane foam, and to each other, which results in intermediate and extensive cross-linking between the compositions.

The novel polymer polyols formed by the polymerization process above, increase the load bearing capacity of the low density and high resiliency of the flexible polyurethane and of the polyurethane/polyorganosiloxane foam and add toughness to the microcellular foam structure. In other words, the varied and novel polymer polyols that become chemically bonded to the polyurethane backbone of the polyurethane foam and to the polyurethane/polyorganosiloxane backbone of the polyurethane/polyorganosiloxane foam contribute to the unique high tensile strength, elongation, tear resistance and impact absorption.

Exemplary Uses

The disclosed polyurethane foam material and polyurethane/polyorganosiloxane mixtures have a wide and useful application. These foams are flexible and comfortable when in contact with vulnerable areas of the human body, are protective from impact damage in an automobile and can be used in a variety of sports activities. These foam layers can be used separately or in combination. If desired they can be infused and/or coated with all weather-water repellant and fire resistant sealant.

When used in combination, theses foams work together to absorb impact shock. During a single or repeated impact, deformation of the open cell polyurethane foam material occurs in which a portion of the soft segments, the polyol group, which is covalently bonded to the hard segment of the polyurethane polymer, isocyanate, is stressed by uncoiling. As a result, the hard segment, i.e. isocyanate, becomes aligned in the stress direction. This reorientation of the hard segment and extensive hydrogen bonding with the chain extender and cross-linkers described above contribute to high tensile strength, elongation, and tear resistance values of the polyurethane foam materials. The polyurethane foam and polyurethane/polyorganosiloxane foam combination can be formed in the shape of an impact absorption device. Exemplary devices are provided in further detail below.

Protective Helmets

Figure 1A:
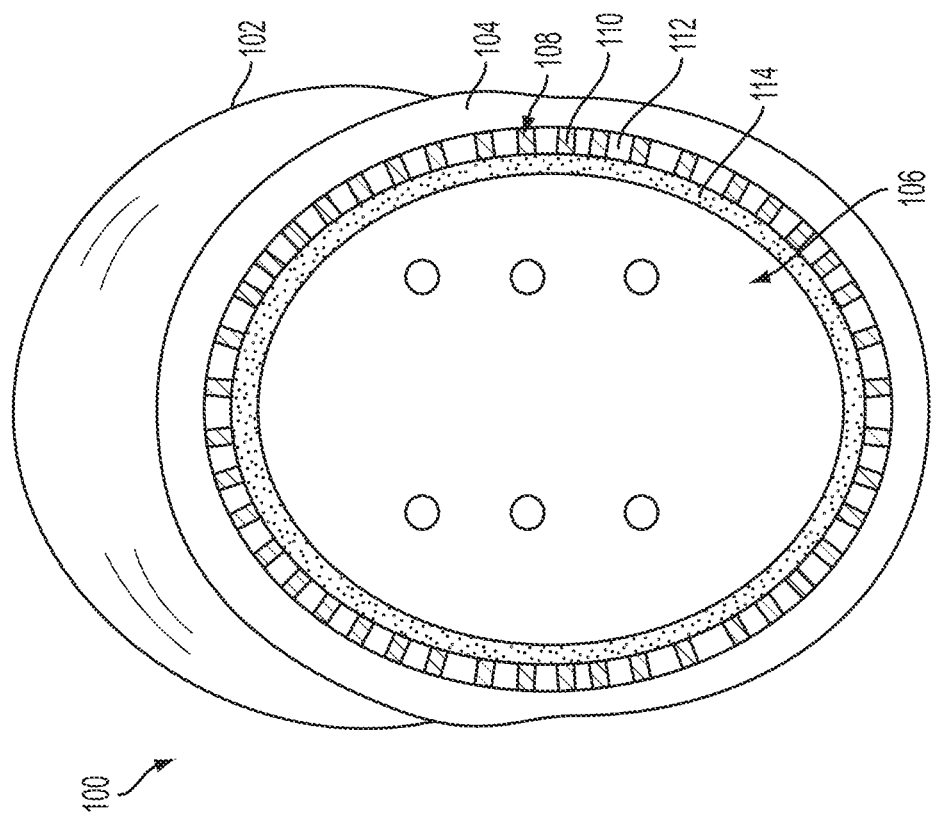
FIG. 1A is schematic bottom view a protective helmet that illustrates one configuration having a composite polyurethane foam material with the polyurethane/polyorganosiloxane foam insert.

In protective helmets and helmet inserts the polyurethane and polyurethane/polyorganosiloxane foams can be fused together to form a protective shell inside the helmet. In one embodiment the polyurethane/polyorganosiloxane foam is the outside layer. This outside layer is fused and cross-linked to the inner polyurethane foam. In another embodiment the polyurethane foam is the outside layer and is cross-linked to an inner polyurethane/polyorganosiloxane foam. In yet another embodiment the polyurethane and polyurethane/polyorganosiloxane foam can both exist in one of the layers. FIG. 1A shows a helmet 100 which includes an outer shell 102. An inner liner 104 can provide additional insulation and comfort to a wearer. A composite liner 106 can include an outer composite layer 108 characterized by a first foam 110 providing structural shape and a second foam 112 acting as a reinforcement filler foam. Each of the first and second foams can be independently selected from the polyurethane foam and the polyurethane/polyorganosiloxane foam. The structural shape can be chambered as illustrated, although other shapes such as triangular, circular, trapezoidal, or the like can also be used. The composite liner can also include an inner foam layer 114 which acts as a comfort layer and also provide protection. The inner foam layer can be formed of any of the foams disclosed herein, although other foams such as, but not limited to, in conjunction and/or in any combination of the following: ethylene vinyl acetate (EVA), polyesters such as polyethylene terephthalate (PET) and polycarbonate, ethylene-propylene co-polymers, polyamides, polyethers, aramids co-polymers, and the like can also be used. FIG. 1B shows a cross-section view of the composite liner 106.

FIG. 1C shows another helmet 150 having a rigid hard shell 152 with an optional inner comfort layer 154. A polyurethane foam insert 156 can be oriented within the hard shell 152. In this configuration, the soft insert 156 can have a single foam layer 158 which is formed of at least one of the polyurethane foams (polyurethane or polyurethane/polysulfide foam as described in this invention). An optional reinforcement layer 160 can be placed and crosslinked along an outer surface of the single foam layer 158. The reinforcement hard layer is composed of polyurethane/polyorganosiloxane foam or polyurethane/polyorganosiloxane/polysulfide foam as described in this invention). A fabric or other suitable layer can then allow securing to the hard/soft shell (e.g. hook-and-loop, or the like) to the helmet inner surface of the rigid hard shell. An inner perforated layer 162 can also be oriented on an inner surface of the foam layer to provide additional moisture wicking, breathability, or other benefits to the wearer. Non-limiting examples of the inner perforated layer with ventilation holes can include a combination of cotton, polyester mesh fabric, flexible polyurethane and a blending of natural and synthetic fibers that repel moisture, pulling it off the skin and into the fabric. FIG. 1D illustrates the insert 156 as a removable insert which can be replaced if damaged or excessively worn.

When foam blocks of varying thickness and length are added and placed strategically inside the polycarbonate/fiberglass or carbon fiber hard shell helmet over a space extending from the forehead to the back of the head, the impact force is absorbed by the fibrous open cell polymers during compression. As a result, the damaging impact from perpendicular and rotational forces takes longer to reach the user's head thus enhancing absorption and dissipation. This decreases or eliminates the chances of a brain concussion during sports activities. The two layer open cell system polymers in their three-dimensional arranged structure are extremely capable of absorbing high and repeated impacts without deformation.

Transportation Vehicles

The polyurethane and polyurethane/polyorganosiloxane foam containing all and any combination of accelerators, initiators, gelling agents, emulsification control agents, reinforcement fillers, cross-linkers, reinforcement polymers, emollients, humectants, stabilizers, and colorants described herein can be used as a protective layer in automobiles, recreation vehicles, watercraft and aircraft. When used in bumpers, doors and outer rims, the foam materials can be used to absorb energy from high impact crashes and protect the vehicles occupants. It can also be used as an outer casing in protecting flammable liquid compartments in all facets of aerospace and in transportation including but not limited to mobility vehicles such cars, trains, boats and airplanes.

In one exemplary embodiment, the foam can be poured into blocks 4 ft in length, 5.5 inches in height and 4 or 3 inches in width (approximately 8 to 10 lbs). These blocks can then be used as the front and rear bumpers of a mobility vehicle or watercraft. The blocks are capable of absorbing high impact energy during high speed crash, are virtually indestructible and capable of absorbing an repeated high energy impact forces. FIG. 2 is an exemplary bumper configurations. In FIG. 2, the bumper 200 is formed of a polyurethane/polyorganosiloxane foam layer 202 that is then cut with a programmable software using a high speed water cutting jet machine from Omax. The programmable software cut various geometric circles and X shapes to allow room for the soft foam 204. Varying programming can be utilized to cut the hard foam in different geometric shapes and size. In one embodiment, a 2 inch wide layer of X's is made and the triangular voids are filled with the polyurethane foam. To fill the void, the polyurethane foam is placed in a mold and as it is rising the polyurethane/polyorganosiloxane foam is placed on top. This allows the polyurethane foam to fill the X space during the polymerization process. The figures display an 1 inch wide hard polyurethane/polyorganosiloxane foam on the outer edges that are interconnected by columns 206 every 8 inches, with an inner layer of the polyurethane foam. This device can also be manufactured with the polyurethane foam as the outer layer and the polyurethane/polyorganosiloxane foam as the inner layer depending on the particular application, desired weight and energy absorption characteristics.

In yet another embodiment, blocks of the polyurethane foam, the polyurethane/polyorganosiloxane foam or blocks containing both of these foams can be created in varying length, width and shape to fit as a cushion within doors of a vehicle or around the exterior of a watercraft. These foams will function as a cushion in the event of a collision. The foam blocks can be secured against a metal framework so that the foam blocks can take, absorb and dissipate impact forces in a crash.

In yet another embodiment, the polyurethane foam, the polyurethane/polyorganosiloxane foam or blocks containing both of these foams can be created and placed between train cars. The foams can be used to absorb an extremely high impact force associated with a collision. This can provide protection among adjacent train compartments by preventing these compartments from compounding each other.

Protective Padding

The flexible open cell two layer foam material containing a polyurethane layer and a polyurethane/polyorganosiloxane layer containing the accelerator, initiator, gelling agent, emulsification control agent, reinforcement filler, cross-Linkers, reinforcement polymers (including polysulfide polymers), emollients, humectants, stabilizers, and colorants and any combination thereof described in this invention can also be configured for use in contact/collision sport activities as protective padding. The two layer system can be changed into a four-layer system where alternating polyurethane and polyurethane/polyorganosiloxane layers can be used to absorb extremely high impact energy. The flexible light weight one or two layer system can be molded for use in any area where impact on the body often occurs such as: helmets, jackets, shoulder pads, elbow pads, thigh pads, knee pads, shin pads, groin pads and any combination thereof. As yet another example, FIGS. 3A and 3B show a groin cup 300 made with the two layer polyurethane and polyurethane/polyorganosiloxane composition. FIG. 3B shows the groin cup 300 having an inner polyurethane layer 302 and an outer harder layer 304 (e.g. polyurethane/polyorganosiloxane). An optional inner fabric layer 306 can be formed of breathable fabric or other suitable material. This groin cup is designed to withstand and absorb high impacts while protecting the human body during high impact sports such as in ultimate fighting sport, football, hockey, baseball, or other sports having risk of injury.

The flexible foam described herein has also been shown to be very effective in shock absorption when configured as a full length sole of varying thickness and length cut in the shape of an interior or exterior of a shoe.

Durability

It is important to note that the fused soft foam layer and the hard/soft foam layer used for bumpers, helmets or groin cups maintains its shape after a high load force is exerted upon it. For example, when a 6 ton X5 BMW runs over these products, the foam flattens under the sheer loads but returns to its original shape without any damage: i.e. reverting back to the shape of a helmet or a groin cup instantly once load is dissipated. The bumper layer is capable of holding the entire weight of a car with slight indentation to accommodate the weight absorption but without any deformation or damage.

EXAMPLES

Example 1—Polyurethane Foam

In one embodiment, the polyurethane foam composition was created by mixing; 20 grams of activated hardwood carbon (60 ml by volume) with 30 grams of Hydrogel-N (Polytek®) (120 ml by volume), 24 grams of Fumed Silica (Polytek®) (240 ml by volume), 2 grams of hydroxyethyl cellulose (5 ml by volume), and 0.1 ml of colorant (Polytek) to the polyol mixture containing 2000 ml of liquid solution of polyol (part B—Polytek) at room temperature. Then, 60 ml of melted and filtered Lodgepole or Pine rosin (200° C.), 10 ml of melted natural rubber (350° F.), 10 ml of melted polystyrene-block-polybutadiene-block-polystyrene (Styrene 30 wt %—Aldrich) (375° F.), 120 ml of polybutadiene synthetic rubber, 240 ml polysulfide polymer solution, and 3 ml of pure silk fibroin solution (Silktap) were added to above mixture at room temperature and stirred in the presence of 3 grams each of sulfur, stearic acid and zinc oxide. This mixture was then placed in a vacuum chamber for 5 minutes and allowed to sit idle for 10 minutes under negative pressure. Following this, 1000 ml of polymethylene bis phenylisocyanate (MDI) and butyl benzyl phthalate solution (Foam Part A—Polytek) was then added to the entire mixture above and stirred vigorously for 10 seconds. The whole mixture is then poured into mold where polymerization reaction begins immediately to form a novel modified soft foam of a 4 lbs/cubic feet density.

Example 2—Polyurethane/Polyorganosiloxane Foam

In another embodiment, the polyurethane/polyorganosiloxane foam composition was created. First, 2000 ml of the polyurethane foam mixture, from above, was made without the addition of MDI solution and without pouring the mixture into a mold. Then, 160 ml of polyorganosiloxane platinum catalyst solution (Soma Foama Part A—smooth-On Inc) was added to that mixture and stirred. A separate mixture containing 1000 ml of MDI and butyl benzyl phthalate solution (Polytek part A) and 80 ml of polyorganosiloxane (Soama Foama Part B—Smooth-On Inc) is then combined and added to the mixture above and stirred vigorously for 10 seconds. The whole mixture is poured into a mold. The polymerization reaction is immediate, exothermic and give rise to hard foam with extremely high tensile strength, toughness and compression resistance with far better flame retardant quality than traditional polyurethane foam and polystyrene used for impact absorption.

Modifications to Examples 1 and 2

Example changes include using different isocyanate, polyol and/or silicone product, isoprenoid, rubber, fibroin and other reinforcers, gelling agents and additives with different methods, volume concentration and density. Concentrations by volume of the above can be varied to form a more hardened or softer foam. For harder flexible foam, 6-10% by volume of melted pine rosin can be added without affecting the polymerization foaming reaction. Alternatively, lower concentrations of pine rosin, e.g. 2.5% by volume, can be used for softer flexible foam. In addition, varied concentration by volume of activated hardwood carbon, fumed silica, hydrogel-N, cellulose, natural and synthetic rubber, silk fibroin and polysulfide polymers can be used with different concentration of melted pine rosin. Variations of these components can also give rise to softer or harder polyurethane foam to be used for different protective commercial applications.

In addition different variations and concentrations of polyorganosiloxane in conjunction with polyurethane, polysulfide polymers, natural and synthetic rubber and silk fibroin can be used to affect cell size, hardness, resiliency and toughness of the hard and soft foam for specific applications. It is worth noting that Soma Foama 25 (25 lbs per cubic feet density) instead of 15 (15 lbs per cubic feet density) or in conjunction with Soma Foama 15 can be used to further strengthen the hard foam. Other variations in chemical structure of the silicon polymers can be used as substitute with similar and/or differing characteristics of the final foam product.

Impact Force Demonstrations
Bumpers

A vehicular bumper 5.5 inches high×4 inches wide×4 ft in length bumper from FIG. 2 was created using the formulations in examples 1 and 2. The bumper was only 12 lbs pounds in weight and was attached to the front bumper of a 6 ton SUV using industrial strength Velcro. The SUV, traveling at speed of 30 miles per hour hit the back bumper of another car at rest. Neither car had any resultant structural damage.

Padding—Impact Force

The polyurethane foam composition was created using the formulation in example 1. The foam was molded into the shape of a 4 inches high×12 inches wide×36 inches long soft foam pad. A full 50 lb plastic Poland Spring Bottle was dropped from 18 ft height above onto the foam. The water bottle did not rupture or have any structural damage following the drop. The polyurethane foam absorbed all of the energy on impact and did not deform.

Repeated Impacted Forces

The polyurethane foam composition above was created using the formulation in example 1. The foam was repeatedly hit using unlimited impact from an industrial hammer at high velocity. The foam did not deform. The tear strength of the foam appears to be at least 20 to 30 times stronger than the regular flexible polyurethane foam in the market today.

Helmets

A polyurethane foam polyurethane/polyorganosiloxane foam combination was created using the formulations in the examples above. The layers were molded such that the polyurethane/polyorganosiloxane foam was exterior to the polyurethane foam layer. This composition was molded as a 1 lb in weight insert for a helmet. (See FIG. 1A). Upon testing the insert was shown to dull the effect of an impact to the level that concussion resulting from a rotational force impact might be severely reduced and/or eliminated.

A similar foam design can be molded for use in a motorbike helmet (about 1 lb in weight) instead of the usual EPS used commercially today (0.5 lbs weight). (See FIG. 1B). Similar benefits can be realized with motorbike helmets.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A polyurethane and polyorganosiloxane foam material comprising at least one layer of cross-linked polyurethane/polyorganosiloxane foam including:
   a) a polyurethane formed by reacting an isocyanate and a polyol;
   b) a polyorganosiloxane having a cross-linkable functional group;
   c) a polymerization catalyst;
   d) a polymerization reaction initiator, said initiator being an isoprenoid compound; and
   e) a polymerization reaction accelerator;
   wherein the polyurethane and the polyorganosiloxane are cross-linked to one another through the cross-linkable functional group and the polyurethane is present in a first portion, and the polyorganosiloxane is present in a second adjacent portion which portions are cross-linked together to form a composite material.

2. The material of claim 1, wherein the first portion has a density of about 4 lbs/ft 3 and the second portion has a density of about 15 lbs/ft 3.

3. The material of claim 1, wherein the isocyanate is methylene bisphenyl isocyanate and the polyol includes polyether polyol.

4. The material of claim 1, wherein the isocyanate is methylene bisphenyl isocyanate and the polyol includes polyether polyol, the isoprenoid is natural pine rosin, and the material further includes alginate-containing hydrogel powder, fumed silica, charcoal, and hydroxyethyl cellulose.

5. The material of claim 1, wherein the polyurethane comprises from about 66 wt. % to about 87 wt. % and the polyorganosiloxane comprises about 8 wt. % to about 25 wt. % of the material.

6. The material of claim 1, wherein the polymerization reaction initiator is selected from the group consisting of: abietic acid, camphor, menthol, natural liquid tree rubber, amyrin and combinations thereof.

7. The material of claim 6, wherein the polymerization reaction initiator is abietic acid derived from pine rosin.

8. The material of claim 1, wherein the polymerization reaction initiator comprises from about 2 wt. % to about 10 wt. % of the material.

9. The material of claim 1, wherein the polymerization reaction accelerator is selected from the group consisting of charcoal, activated carbon, diamonds, fullerenes, graphites, coke, coal, and combinations thereof.

10. The material of claim 1, wherein the material further comprises a gelling agent, an emulsification control agent, a reinforcement filler, or a combination thereof.

11. The material of claim 10, wherein the material includes the gelling agent which is a member selected from the group consisting of alginate-containing hydrogel powder, methylcellulose, xanthan, carboxymethyl cellulose, hyaluronan, polyethylene, carrageenans, polypropylene glycol, agar and polyvinylpyrrolidone, polyacrylic acid, hydrocolloid polyesters, chitosen, collagen, and any combination thereof.

12. The material of claim 10, wherein the material includes at least one emulsification control agent and wherein the at least one emulsification control is selected from the group consisting of fumed silica, silicone oil, nonylphenol ethoxylates, polydimethylsiloxane-polyoxyalkylene, polyethylene terephthalate, carbon nanotube, calcite, dolomite, calcium carbonate, and any combination thereof.

13. The material of claim 10, wherein the material includes at least one reinforcement filler and at least one reinforcement filler is selected from the group consisting of hydroxyethyl cellulose polymer, hydroxypropyl methyl cellulose, hydroxyethyl methyl cellulose, ethyl cellulose, nitrocellulose, cellulose acetate, methylcellulose, natural tree rubber latex, synthetic rubber (polybutadiene), hot-melt branched polystyrene block polybutadiene, polysulfide polymers, and any combination thereof.

14. The material of claim 13, where the at least one reinforcement filler cross-links with the polyurethane foam.

15. The material of claim 10, wherein the at least one reinforcement polymer is selected from the group consisting of natural rubber, synthetic rubber such as polybutadiene and polystyrene-block-polybutadiene-block-polystyrene, polysulfide polymers and pure silk fibroin and combinations thereof.

16. The material of claim 1, wherein the polymerization catalyst is platinum.

17. The material of claim 1, wherein the cross-linker is selected from the group consisting of ethylene glycol, zinc-oxide, sulfur, 1,4-butanediol, 1,6-hexanediol, cyclohexanedimethanol, hydroquinone bis(2-hydroxyethyl)ether (HQEE), and combinations thereof.

18. The material of claim 1, further comprising a polysulfide.

19. The material of claim 1, wherein the material is formed in a shape of an impact absorption device.

20. The material of claim 19, wherein the shape is at least one of a bumper cushion of a vehicle, a cushion within a door of a vehicle, and a protective padding.

21. The material of claim 20, wherein the protective padding is selected from the group consisting of a helmet, shoulder pad, elbow pad, thigh pad, knee pad, shin pad, groin pad, shoe sole, and any combination thereof.

* * * * *